(12) United States Patent
Matsubara et al.

(10) Patent No.: US 7,658,871 B2
(45) Date of Patent: Feb. 9, 2010

(54) METHOD OF PREPARING A NEGATIVE ACTIVE MATERIAL FOR RECHARGEABLE LITHIUM BATTERY

(75) Inventors: Keiko Matsubara, Yokohama (JP);
Akira Takamuku, Yokohama (JP);
Toshiaki Tsuno, Yokohama (JP);
Sung-Soo Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/182,998

(22) Filed: Jul. 30, 2008

(65) Prior Publication Data
US 2008/0302999 A1 Dec. 11, 2008

Related U.S. Application Data

(62) Division of application No. 10/923,300, filed on Aug. 20, 2004, now abandoned.

(30) Foreign Application Priority Data

Aug. 22, 2003 (JP) .............................. 2003-299282
Feb. 12, 2004 (KR) ...................... 10-2004-0009366

(51) Int. Cl.
*A62D 3/00* (2007.01)
(52) U.S. Cl. .................. 252/519.54; 29/623.1; 427/58; 429/218.1; 429/232
(58) Field of Classification Search ............. 252/182.1, 252/186.2, 500, 519.64; 29/623.1; 204/192.15; 419/66; 429/209, 218.1, 231.95, 232; 427/58
See application file for complete search history.

(56) References Cited

U.S. PATENT DOCUMENTS

| 6,066,414 A | * | 5/2000 | Imoto et al. | ............... 429/218.1 |
| 6,103,213 A | | 8/2000 | Nakamura et al. | |
| 6,235,427 B1 | * | 5/2001 | Idota et al. | ............... 429/218.1 |
| 6,541,156 B1 | * | 4/2003 | Fuse et al. | ............... 429/218.1 |

(Continued)

FOREIGN PATENT DOCUMENTS

JP           3-163758           7/1991

(Continued)

OTHER PUBLICATIONS

Sirleto, et al., *Spontaneous Raman emission in porous silicon at 1.5 μm and prospects for a Raman amplifier*, Journal of Optics A: Pure and Applied Optics, vol. 8, (2006), pp. S574-S577.

(Continued)

*Primary Examiner*—Mark Kopec
*Assistant Examiner*—Khanh Tuan Nguyen
(74) *Attorney, Agent, or Firm*—Christie, Parker & Hale, LLP

(57) ABSTRACT

Disclosed is a negative active material for a rechargeable lithium battery comprising a Si phase, a SiM phase and at least one of a X phase and a SiX phase, wherein each of phases has a crystal grain size of 100 nm and 500 nm. The element M is at least one selected from the group consisting of Ni, Co, B, Cr, Cu, Fe, Mn, Ti, and Y, the element X is at least one selected from the group consisting of Ag, Cu, and Au. However, where M is Cu, X is not Cu.

3 Claims, 6 Drawing Sheets

U.S. PATENT DOCUMENTS

| | | | |
|---|---|---|---|
| 6,555,272 | B2 | 4/2003 | Suzuki et al. |
| 6,576,366 | B1* | 6/2003 | Fujiwara et al. .......... 429/218.1 |
| 6,679,925 | B1* | 1/2004 | Tanizaki et al. ............ 29/623.1 |
| 6,730,434 | B1* | 5/2004 | Kawakami et al. ....... 429/218.1 |
| 6,887,623 | B2* | 5/2005 | Fujimoto et al. ............ 429/232 |
| 2002/0009646 | A1 | 1/2002 | Matsubara et al. |
| 2002/0048705 | A1 | 4/2002 | Park et al. |
| 2002/0146623 | A1* | 10/2002 | Suzuki et al. ............ 429/218.1 |
| 2003/0031782 | A1* | 2/2003 | Sayama et al. ................ 427/58 |
| 2003/0054252 | A1 | 3/2003 | Kusumoto et al. |
| 2004/0197660 | A1 | 10/2004 | Sheem et al. |
| 2004/0234859 | A1 | 11/2004 | Lee et al. |

FOREIGN PATENT DOCUMENTS

| | | | |
|---|---|---|---|
| JP | 4-249862 | | 9/1992 |
| JP | 6-272026 | | 9/1994 |
| JP | 9-249407 | | 9/1997 |
| JP | 10-102243 | | 4/1998 |
| JP | 10-223221 | | 8/1998 |
| JP | 10-294112 | * | 11/1998 |
| JP | 11-086853 | | 3/1999 |
| JP | 11-242954 | | 9/1999 |
| JP | 2000-149937 | | 5/2000 |
| JP | 2000-173594 | | 6/2000 |
| JP | 2001-283833 | | 10/2001 |
| JP | 2002-008652 | | 1/2002 |
| JP | 2002-124254 | * | 4/2002 |
| JP | 2002-260637 | * | 9/2002 |
| JP | 2003-077529 | * | 3/2003 |
| WO | WO 03/043109 | | 5/2003 |

OTHER PUBLICATIONS

Patent Abstracts of Japan, Publication No. 03-163758, dated Jul. 15, 1991 in the name of Noda Tomohiko et al.

Patent Abstracts of Japan, Publication No. 04-249862, dated Sep. 4, 1992, in the name of Yasuhiro Fujita et al.

Patent Abstracts of Japan, Publication No. 06-272026, dated Sep. 27, 1994, in the name of Yasuhiro Fujita et al.

Patent Abstracts of Japan, Publication No. 09-249407, dated Sep. 22, 1997, in the name of Hiroaki Wakayama et al.

Patent Abstracts of Japan, Publication No. 10-102243, dated Apr. 21, 1998, in the name of Shunichiro Tanaka et al.

Patent Abstracts of Japan, Publication No. 10-223221, dated Aug. 21, 1998, in the name of Maoto Miyake et al.

Patent Abstracts of Japan, Publication No. 10-294112, dated Nov. 4, 1998, in the name of Nakajima et al.

Patent Abstracts of Japan, Publication No. 11-086853, dated Mar. 30, 1999, in the name of Junya Kaneda et al.

Patent Abstracts of Japan, Publication No. 11-242954, dated Sep. 7, 1999, in the name of Soichiro Kawakami et al.

Patent Abstracts of Japan, Publication No. 2000-149937, dated May 30, 2000, in the name of Yoshiaki Nitta et al.

Patent Abstracts of Japan, Publication No. 2000-173594, dated Jun. 23, 2000, in the name of Takafumi Fujiwara et al.

Patent Abstracts of Japan, Publication No. 2001-283833, dated Oct. 12, 2001, in the name of Masahisa Fujimoto et al.

Patent Abstracts of Japan, Publication No. 2002-008652, dated Jan. 11, 2002, in the name of Keiko Matsubara et al.

Idota, Y., et al., "Tin-Based Amorphous Oxide: A High-Capacity Lithium-Ion-Storage Material", Science, vol. 276, pp. 1395-1397, (May 30, 1997).

Miyamoto, N., et al., "Synthesis of Manganese Dioxide from Manganese Acetate and Ammonium Peroxiodisulfate for Lithium Primary Cells", The Electrochemical Society of Japan, The Committee of Battery Technology, 43rd Preview of Battery Discussion, pp. 308-310, (Received Nov. 16, 2001; Accepted Feb. 8, 2002).

* cited by examiner

METHOD OF PREPARING A NEGATIVE ACTIVE MATERIAL FOR RECHARGEABLE LITHIUM BATTERY

CROSS REFERENCE TO RELATED APPLICATION

This application is a divisional of U.S. patent application Ser. No. 10/923,300, filed Aug. 20, 2004 now abandoned and claims priority to and the benefit of Japanese Patent Application No. 2003-299282 filed in the Japanese Patent Office on Aug. 22, 2003 and Korean Patent Application No. 2004-9366 filed in the Korean Intellectual Property Office on Feb. 12, 2004, both of which are hereby incorporated by reference in their entireties for all purposes as if fully set forth herein.

BACKGROUND OF THE INVENTION (a) Field of the Invention

The present invention relates to a negative active material for a rechargeable lithium battery, a method of preparing the same, and a rechargeable lithium battery.

(b) Description of the Related Art

Although research to develop a negative active material having a high capacity based on metallic materials such as Si, Sn, and Al has actively been undertaken, such research has not yet succeeded in applying said metals to a negative active material. This is mainly due to problems in that the cycle characteristics are deteriorated by a series of processes of intercalating and deintercalating lithium ions with metals such as Si, Sn, and Al, and the consequential expansion and contraction of the volume thereof, which pulverizes the metal to a fine powder. In order to attempt to solve these problems, an amorphous alloy oxide has been suggested by Y. Idota, et al: Science, 276, 1395(1997). In addition, it is reported that a negative active material comprising an amorphous structured alloy improves a battery's cycle characteristics in 43rd Preview of Battery Discussion (The Electrochemical Society of Japan, The Committee of Battery Technology, Oct. 12, 2002, p. 308-309).

Although Si is expected to provide a higher capacity, Si is generally known to be too hard to be transferred to an amorphous phase either by itself or in an Si-alloy form. However, recently, it has been reported that Si material can be transferred into amorphous phase via a mechanical alloying process.

As mentioned in 43rd Preview of Battery Discussion (The Electrochemical Society of Japan, The Committee of Battery Technology, Oct. 12, 2002, p. 308-309), amorphous alloy material has a good early stage capacity retention rate relative to that of crystalline alloy material, but that capacity tends to remarkably decrease after repeated charge-discharge cycles. For amorphous material, as it does not have the same structure as a crystal material, the expansion rate upon charging is relatively low and the characteristics deteriorate less upon repeated charge and discharge compared to those for crystal material. In addition, the amorphous material can improve the early stage cycle characteristics better than crystal material because the lithium ion is better diffused. Further, although the active material is not fully charged in the very early stage, the utilization of an active material is slowly increased upon repeating cycles and, as a result, the deterioration of the cycle characteristics due to the pulverization of the material to a fine powder is alleviated. However, upon repeating the cycles, it is anticipated that the cycle characteristics will deteriorate due to the pulverization of the material to a fine powder and the exhaustion of the active material.

For a mechanical alloying process, a pulverizing step into fine powder and a compressing step are repeated to slowly reduce the crystal degree to provide an amorphous or pulverized material. However, such a process may cause problems in that the interface is broken between the tiny alloy structures identified via a X-ray diffraction analysis, and the structure is easily broken upon intercalating lithium ions and pulverized. Thereby the cycle characteristics deteriorate.

SUMMARY OF THE INVENTION

In one embodiment of the present invention a negative active material is provided that is capable of preventing the active material from pulverizing into fine powder resulting in improved cycle characteristic. Further embodiments include a method of preparing such a negative active material, and a rechargeable lithium battery comprising the negative active material.

In another embodiment of the present invention a negative active material is provided for a rechargeable lithium battery in which the material consists essentially of Si phase and SiM phase material with at least one of X phase and SiX phase, wherein each crystalline grain of the phases has a diameter of between 100 nm and 500 nm, and wherein the element M is selected from the group consisting of Ni, Co, B, Cr, Cu, Fe, Mn, Ti, Y, and combinations thereof, and the element X is selected from the group consisting of Ag, Cu, Au, and combinations thereof, provided that Cu is not selected for both element M and element X.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
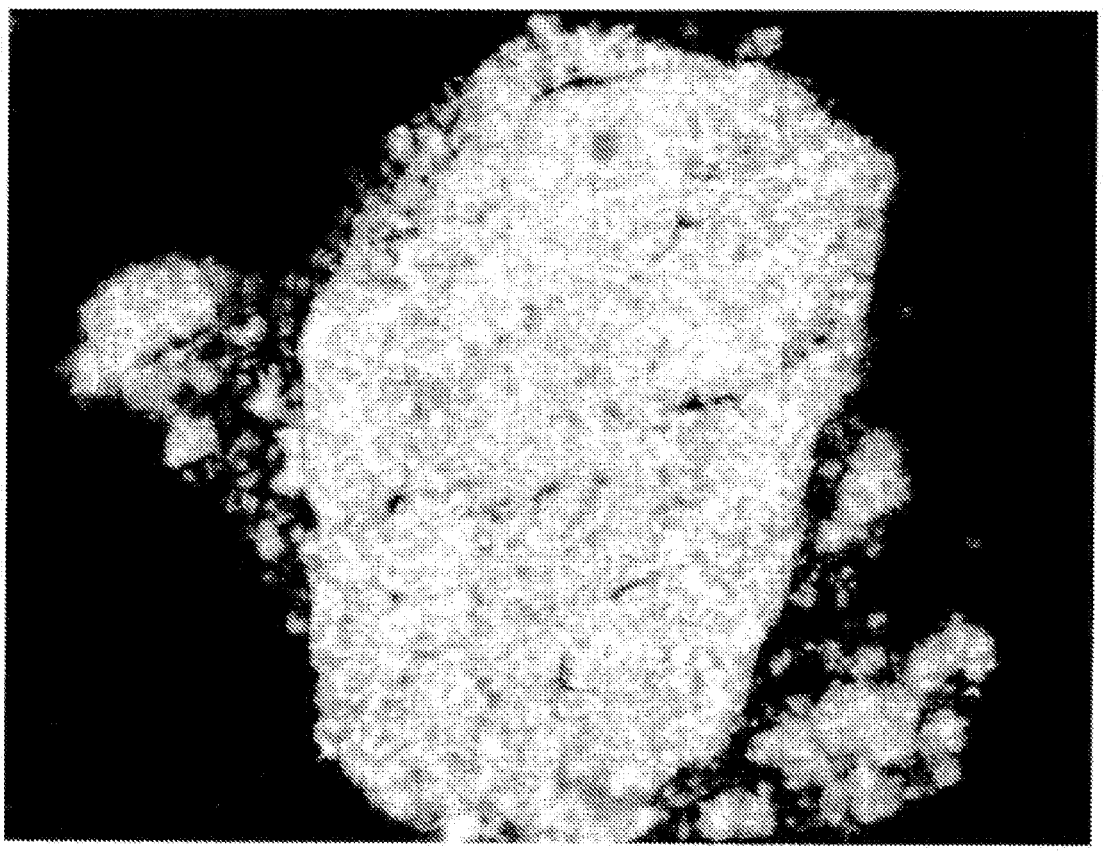
FIG. 1 is a SEM photograph of the negative active material of Example 1.

According to the present invention, a negative active material for a rechargeable lithium battery has a crystal grain comprising Si phase and SiM phase with a very small diameter of 500 nm or less with the grains closely aggregated with one another. According to this structure, it is difficult to destroy the structure even though expansion and contraction are repeated upon charging and discharging the lithium. These properties can improve the cycle characteristics.

Further, since the structure comprises SiM phase in addition to Si phase, the volume to be expanded and contracted for the particle can be reduced which can prevent the pulverization of the particle into fine powder such as occurs with a negative active material with a single Si phase. Consequently, the cycle characteristics are improved.

Further, the structure can prevent a reduction in the specific resistance of the negative active material as it comprises either one or both of X phase and SiX phase.

Further, where Cu is alloyed with Si, because it has a specific resistance lower than that of Si, it can reduce the specific resistance of the negative active material. While Cu can be used for either of element M or element X, it is important that elements M and X be different. Accordingly, Cu is not selected for both element M and element X when practicing the present invention.

According to present invention, element M is preferably selected to have a boiling point higher than that of element X.

The negative active material for the rechargeable lithium battery of the present invention is prepared by mechanically alloying Si particles provided in a powder form and particles of element M, also in powder form. The resulting SiM alloy is heated and element X is added as a powder to the heated SiM alloy. The mixture is alloyed again by a mechanical alloying method to provide a SiMX alloy, and heated at a temperature less than that of the first heating step. Element M is selected from the group consisting of Ni, Co, B, Cr, Cu, Fe, Mn, Ti, Y, and combinations thereof, and element X is selected from Ag, Cu, Au, and combinations thereof, provided however, that Cu is not selected for both element M and element X at the same time.

As set forth above, the negative active material for the rechargeable lithium battery is obtained by alternatively repeating a mechanical alloying step and a heating step. Thereby, the structure of the obtained negative active material is very closely aggregated and has a tiny crystal phase. Since the second heating temperature is less than that of the first heating temperature, the previously formed SiM phase is not melted during the second heating process and it is possible to deposit the tiny crystal of Si phase, SiM phase, X phase and SiX phase. The resulting negative active material preferably has a crystal structure with a crystal grain diameter between 100 nm and 500 nm.

The rechargeable lithium battery of the present invention comprises the aforementioned negative active material for the rechargeable lithium battery. Thereby, it is possible to provide a rechargeable lithium battery with good cycle characteristics.

According to a preferred method for preparing the negative active material for the rechargeable lithium battery of the present invention, the temperature of the first heating step is preferably between $(Tm-100)°$ C. and $(Tm-20)°$ C. where Tm is the melting point of the SiM alloy phase.

The negative active material for the rechargeable lithium battery of the present invention is constructed of crystal powder which consists essentially of Si phase and SiM phase with at least one of X phase and SiX phase.

Preferably, each of Si phase, SiM phase, X phase, and SiX phase is a crystal particle having a diameter of between 100 nm and 500 nm, and the phases are closely aggregated with one another.

In a battery, the Si phase is alloyed with the lithium upon charging the battery to form a $LiSi_X$ phase, and the lithium is released upon discharge to return to Si single phase. Further, the SiM phase does not react with the lithium upon charge or discharge and the shape of the powder particle remains which prevents the particles form expanding and contracting. The element M of the SiM phase is not alloyed with the lithium and M is preferably an element selected from the group consisting of Ni, Co, B, Cr, Cu, Fe, Mn, Ti, Y and combinations thereof. The element M is most preferably Ni. In such an embodiment, the composition of the SiM phase is $Si_2Ni$ phase. Element M preferably has a melting point higher than that of element X.

Further, the X phase decreases the specific resistance of the negative active material by providing better conductivity to the negative active material powder. Element X is preferably a metal element having a specific resistance of $3\Omega \cdot m$ or less and is preferably selected from the group consisting of Ag, Cu, Au and combinations thereof. Particularly, Cu will not alloy with the lithium to decrease the irreversible capacity. Thereby, it is possible to increase the capacity of the charge and discharge.

Further, Cu is not alloyed with Si and, at the same time, has a specific resistance less than that of Si, decreasing the specific resistance of the negative active material. Therefore, Cu has features of both element M and element X, but according to the present invention, Cu is not selected for both element M and element X at the same time.

Further, it is possible to deposit X phase or SiX phase together with X phase. SiX phase decreases the specific resistance of the negative active material by applying the conductive to the multi-phase alloy powder as in the X phase.

The crystal structure of Si phase, SiM phase, X phase, and SiX phase is preferably a crystal phase. However, it may further comprise other phases which may be crystal or amorphous.

Each phase preferably has a crystal grain diameter of between 100 nm and 500 nm. When the crystal grain has a diameter of less than 100 nm, the particle becomes weaker by the repeated pulverization into fine powder and compression, and the interface is peeled out to be pulverized into fine powder by expanding and contracting upon the charge and discharge. When the diameter is more than 500 nm, the expansion rate is increased by charging the main active material of Si phase, and it is difficult to prevent the Si phase from expanding due to the SiM phase, the X phase and the SiX phase.

The average diameter of the negative active material powder is preferably between 5 μm and 30 μm. Generally, as a Si-included alloy particle has a resistance more than that of graphite powder generally used for the conventional negative electrode material of a lithium ion battery, it is preferable to add a conductive agent. However, an average diameter less than 5 μm is undesirable in that the multi-phase alloy particle may have an average diameter less than that of the conductive agent, thus it is difficult to achieve the desired effects of the conductive agent and the battery characteristics such as capacity and cycle characteristics deteriorate. When the average diameter is more than 30 μm, it is undesirable because the charge density of the negative active material decreases for a lithium battery.

Further, according to the present invention, the particle shape of the negative active material is mostly estimated as being amorphous.

Subsequently, as Si is an element constructing both a Si single phase and a SiM phase in the alloy composition, it is preferable that Si is added in amounts higher than the stoichiometric concentration of element M. When the amount of Si is less than the stoichiometric concentration of the element M, it is undesirable in that the SiM phase and the M phase are deposited due to a lack of Si, but the Si phase contributing to the charge and discharge is not deposited so that the charge and discharge is not carried out. When Si is excessively added, it is undesirable in that the Si phase is overly deposited to increase the total amount of expansion and contraction of the negative active material upon repeating the charge and discharge, the negative active material is easily pulverized into fine powder to deteriorate the cycle characteristics. Preferably, the negative active material has a composition ratio of Si between 30% by weight and 70% by weight.

As element M is an element forming a SiM phase together with Si, it is preferable to add it in amount less than that of the stoichiometric concentration of Si. When the amount of element M is more than the stoichiometric concentration of Si, it is undesirable in that Si is relatively unable to deposit the SiM phase and M phase so that the Si phase contributing to the charge and discharge is not deposited. Thereby, the charge and discharge is not generated. Further, when too little M is used it is undesirable because the Si phase is overly deposited to increase the total expansion volume of the negative active material upon the charge and discharge, and the negative active material is pulverized into fine powder to deteriorate the cycle characteristics. Preferably, the composition of the element M in the negative active material is between 20% by weight and 69% by weight. The element M is not alloyed with the lithium so that it does not have the irreversible capacity.

When the composition ratio of element X is increased, the specific resistance is decreased, but the Si phase is relatively decreased, thus deteriorating the charge and discharge capacity. On the other hand, when the composition ratio of element X is decreased, the specific resistance of the negative active material is increased, deteriorating the charge and discharge effectiveness. For this reason, the composition ratio of the element X is preferable between 1% by weight and 30% by weight in the negative active material.

According to the present invention, the negative active material for a rechargeable lithium battery has a crystal grain of Si phase and SiM phase having a very small diameter of 500 nm or less and each grain is closely aggregated. Thereby, the structure is rarely destroyed or pulverized even with the expansion and contraction caused by the charge and discharge of the lithium, so that the cycle characteristic are improved.

As it further comprises SiM phase in addition to Si phase in the structure, the volume of expanding and contracting the particles may decrease compared to Si single phase. This prevents the particle from pulverizing into fine powder so that the cycle characteristics are improved.

As it comprises at least one of the X phase and SiX phase, the specific resistance of the negative active material decreases.

Hereinafter, a rechargeable lithium battery comprising the negative active material is described. The rechargeable lithium battery comprises at least a negative electrode comprising the negative active material, a positive electrode, and an electrolyte.

The negative electrode for the rechargeable lithium battery may be, for example, a sheet-shaped electrode formed by solidifying the alloy powder of the negative active material with a binder. Further examples include a pellet solidified as a disc shape, a cylinder shape, a plan shape or a conical shape.

The binder may be either an organic or an inorganic material capable of being dispersed or dissolved in a solvent with a negative active material alloy powder. The alloy particles are bound by removing the solvent. Furthermore, the binder may be a material capable of being dissolved with the alloy powder and binding the alloy powder by a solidification process such as a press shaping process. Examples of binders include resins such as vinyl based resins, cellulose based resins, phenol resins, and thermoplastic resins. More specific examples include polyvinylidene fluoride, polyvinyl alcohol, carboxymethyl cellulose, styrene butadiene rubber, and similar materials.

In addition to the negative active material and the binding gent, the negative electrode may be prepared by further adding carbon black, graphite powder, carbon fiber, metal powder, metal fiber, or some other material as a conductive agent.

Subsequently, the positive electrode comprises, for example, a positive active material capable of intercalating and deintercalating the lithium such as $LiMn_2O_4$, $LiCoO_2$, $LiNiO_2$, $LiFeO_2$, $V_2O_5$, TiS, MoS, organosulfide compounds, polysulfide compounds and a Ni, Mn, or Co based composite oxide. The positive electrode may further include a binder such as polyvinylidene fluoride and a conductive agent such as carbon black in addition to the positive active material.

Specific examples for the positive electrode and the negative electrode may be exemplified as a sheet-shaped electrode prepared by coating the conductor of a metal foil or a metal mesh on the positive electrode or the negative electrode.

The electrolyte may include an organic electrolyte with which the lithium is dissolved in an aprotonic solvent.

Aprotonic solvents include, but are not limited to, propylene carbonate, ethylene carbonate, butylene carbonate, benzonitrile, acetonitrile, tetrahydrofurane, 2-methyl tetrahydrofurane, γ-butyrolactone, dioxolane, 4-methyl dioxolane, N,N-dimethyl formamide, dimethyl acetoamide, dimethyl sulfoxide, dioxane, 1,2-dimethoxy ethane, sulfolane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether or similar solvents or mixtures of such solvents with other solvents such as propylene carbonate (PC), ethylene carbonate (EC), butylene carbonate (BC), dimethyl carbonate, methylethyl carbonate (MEC), or diethyl carbonate (DEC).

The lithium salt may include, but is not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural number), LiCl, LiI, or mixtures thereof, and preferably is any one of $LiPF_6$, $LiBF_4$, $LiN(CF_3SO_2)_2$, and $LiN(C_2F_5SO_2)$.

The electrolyte may further include a polymer such as PEO, PVA or similar polymers with any one of the lithium salts, and polymer electrolyte incorporated with the polymer in the organic electrolyte.

Further, in addition to the positive electrode, the negative electrode, and the electrolyte, the rechargeable lithium battery may further comprise, if required, any other material such as a separator interposing the positive electrode and the positive electrode.

As the rechargeable lithium battery comprises a negative active material having a crystal grain such as a Si phase and a SiM phase having a very small diameter of 500 nm or less, or with the phases closely aggregated with each other, it is rarely possible to destroy the structure even though the expansion and contraction are repeated upon charging and discharging the lithium. Thereby, the cycle characteristics of the battery are improved.

Hereinafter, a method of preparing a negative active material for a rechargeable lithium battery is described. According to the present invention, the method comprises the steps of: first alloying an element Si and an element M by a mechanical alloying process to provide a SiM phase alloy; first heating the SiM alloy; adding a powder of element X to the heated SiM alloy; second alloying the same by a mechanical alloying process to provide a SiMX alloy; and second heating the SiMX alloy.

First, a Si powder and an element M powder are mixed and alloyed by a mechanical alloying process at the first alloying step. Si powder may include any one having an average diameter of between 1 and 10 μm, while the element M powder may include any one having an average diameter of between 0.5 and 10 μm. The Si powder and the element M are introduced into a ball mill and an attritor and alloyed by the mechanical alloy in which the pulverization into fine powder and the compression are repeated. Thereby, a SiM alloy is obtained. The mechanical alloying process is preferably continued until the SiM alloy becomes amorphous.

During the first heating step, the SiM alloy is heated so that the amorphous state is transferred into the crystalline state. The heating temperature $T_1$ is preferably between (Tm-100)° C. and (Tm-20)° C. where Tm is the melting point of the SiM alloy phase. When the heating temperature $T_1$ is less than (Tm-100)° C., the SiM alloy is insufficiently crystallized, while when the heating temperature $T_1$ is more than (Tm-20)° C., the alloy crystal structure is too large. Furthermore, the heating time is preferable between 1 and 4 hours. The heating step is preferably carried out under an inert gas atmosphere of nitrogen, argon or a similar gas. Upon heating the SiM alloy, the Si phase and the SiM phase are developed with the resulting structure having a crystal grain diameter of between 100 and 500 nm.

Then, during the second alloying step, the mixture of the SiM alloy and the element X powder is alloyed by the mechanical alloy process. The element X powder has an average diameter of between 0.5 and 10 μm. The SiM alloy and the element X are introduced into, for example, a ball mill or an attritor, and are alloyed by a mechanical alloying process in that the pulverization into fine powder and the compression are repeated. Thereby, a SiMX alloy is obtained. The mechanical alloying process is preferably continued until the SiMX alloy becomes amorphous.

During the second heating step, the SiMX alloy is heated to transfer the amorphous state into the crystalline state. The temperature $T_2$ in the second heating step is lower than the temperature $T_1$ of the first heating step, and the second heating process is preferably carried out between (Tx-200)° C. and (Tx-20)° C. where Tx is the melting point of the metal X. If the second heating temperature $T_2$ is higher than the first heating temperature $T_1$, the crystal grain of the SiM phase will dissolve and upon re-crystallization will tend to swell. When the second heating temperature $T_2$ is higher than (Tx-200)° C., the SiX alloy is insufficiently crystallized. If the second heating temperature $T_2$ is lower than (Tx-20)° C., the X phase is re-crystallized so that the desired tiny crystal grain is not obtained. The duration of the heating step is preferable between 2 and 5 hours. The heating step is preferably carried out under an inert gas atmosphere of nitrogen, argon or a similar gas. By heating the SiMX alloy, it can comprise at least one of Si phase and SiMX phase and the structure can have a crystal grain with a diameter of between 100 and 500 nm.

While the element M preferably has a higher melting point than that of element X to prevent the SiM phase from melting during the second heating step.

According to the method of preparing the negative active material for the rechargeable lithium battery, the mechanical alloying process and the heating process are alternatively repeated, so that the structure of the negative active material becomes very dense with a tiny crystal phase.

Further, during the second heating step, as the second heating temperature is lower than the first heating temperature, the previously formed SiM phase is not melted during the second heating step. This permits the formation of the desired tiny crystals of Si phase, SiM phase, X phase, and SiX phase.

The following examples further illustrate the present invention in detail but are not to be construed to limit the scope thereof.

Experimental Example 1

23 g Si powder and 7 g Ni powder as element M were mixed and introduced into a stainless vessel with 300 g stainless balls having a diameter of 10 mm. Subsequently, the stainless vessel was mounted with a mechanical alloying device, a rocking mill manufactured by Sewa Mechanical Research Company. The mixture was subjected to the mechanical alloying treatment for 20 hours at a frequency of 700 rpm. Then, the obtained powder was put into 20 mm mold, pressed at a pressure of 4t to provide a pellet, and heated at 970° C. for 5 hours. Thereby, a SiNi alloy was obtained.

After heating, 5 g Ag powder as element X was mixed with 25 g of the SiNi alloy, and put into a stainless vessel with 300 g stainless balls having diameter of 10 mm. The stainless vessel was mounted with the mechanical alloy device and subjected to a mechanical alloy treatment for 20 hours at a frequency of 700 rpm. Then, the resulting powder was injected into a mold having a diameter of 20 mm and pressed at a pressure of 4t to obtain a pellet, and heated at 940° C. for 5 hours. After heating, the pellet was pulverized into a fine powder in a mill, and separated by a sieve, to provide a SiNiAg alloy powder having a diameter of between 1 and 45 μm and an average diameter of 15 μm. The composition weight ratio of the obtained alloy was Si:Ni:Ag=64:19:17.

Experimental Example 2

64 parts by weight of Si powder were mixed with 19 parts by weight of Ni powder as element M and 17 parts by weight of Ag powder as element X and put into a stainless vessel with 300 g stainless balls having diameter of 10 mm. The stainless device was mounted with the mechanical alloy device and subjected to a mechanical alloy treatment for 20 hours at a frequency of 700 rpm. Then, the resulting powder was injected into a mold with a diameter of 20 mm and pressed at a pressure of 4t to obtain a pellet, and heated at 940° C. for 5 hours. After heating, the pellet was pulverized into a fine powder in a mill, and separated by a sieve, to provide a SiNiAg alloy powder having a diameter of between 1 and 45 μm and an average diameter of 15 μm.

Experimental Example 3

64 parts by weight of Si powder were mixed with 19 parts by weight of Ni powder as element M and 17 parts by weight of Ag powder as element X and put into a stainless vessel with 300 g stainless balls having diameter of 10 mm. The stainless device was mounted with the mechanical alloy device and subjected to a mechanical alloy treatment for 20 hours at a frequency of 700 rpm. Then, the resulting powder was pulverized into a fine powder and separated by a sieve, to provide a SiNiAg alloy powder having a diameter of between 1 and 45 μm and an average diameter of 15 μm.

Experimental Example 4

64 parts by weight of Si powder were mixed with 19 parts by weight of Ni powder as element M and 17 parts by weight of Ag powder as element X and dissolved by high frequency heating under an Ar atmosphere to provide a molten alloy. The resulting mixed molten metal was quenched by a gas atomizing process to provide a SiNiAg alloy powder. The resulting quenched alloy powder was heated at 940° C. for 5 hours. After heating, the alloy powder was pulverized into a fine powder and separated by a sieve, to provide a SiNiAg alloy powder having a diameter of between 1 and 45 μm and an average diameter of 15 μm.

Figure 2:
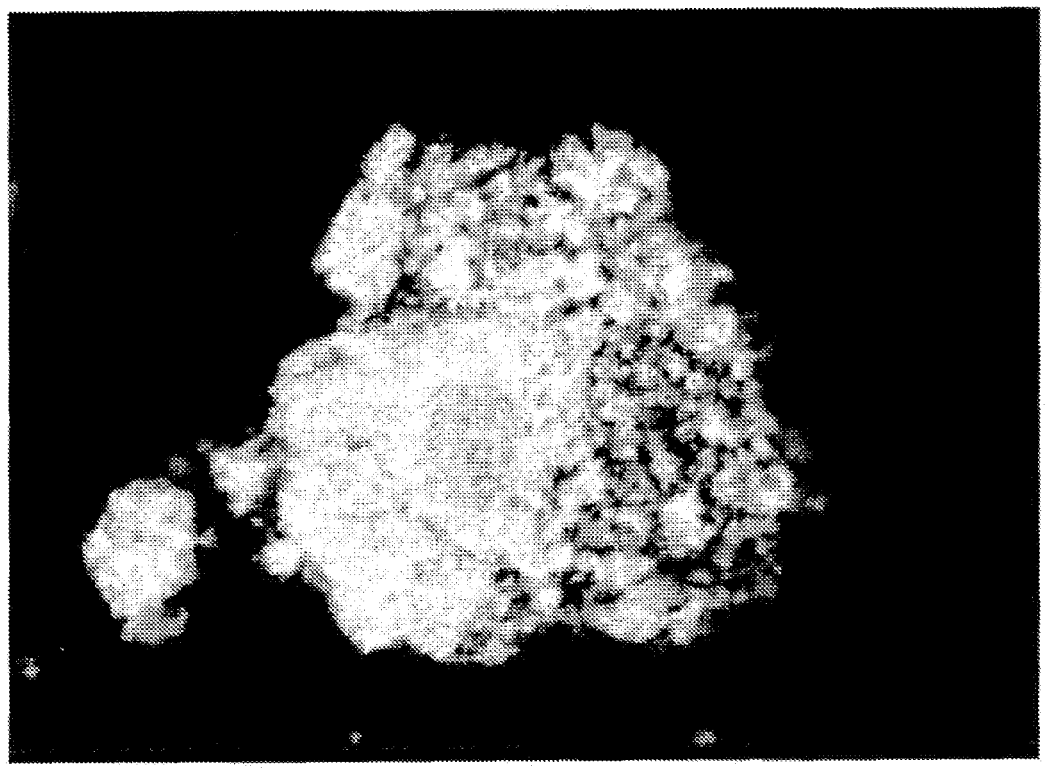
FIG. 2 is a SEM photograph of the negative active material of Example 2.
Figure 3:
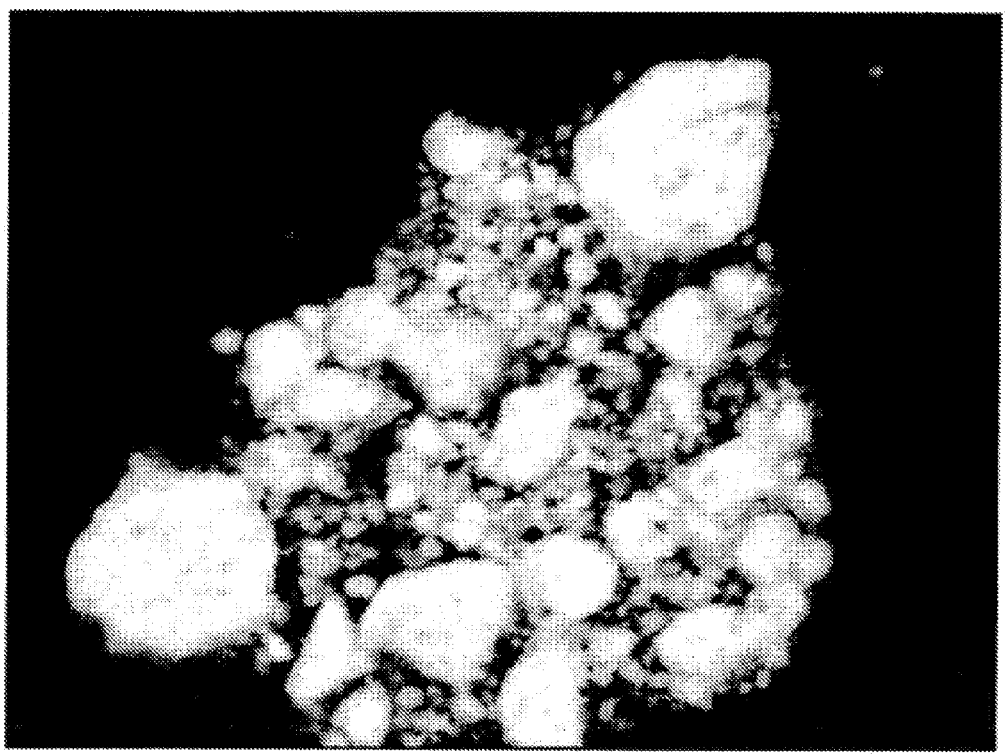
FIG. 3 is a SEM photograph of the negative active material of Example 3.
Figure 4:
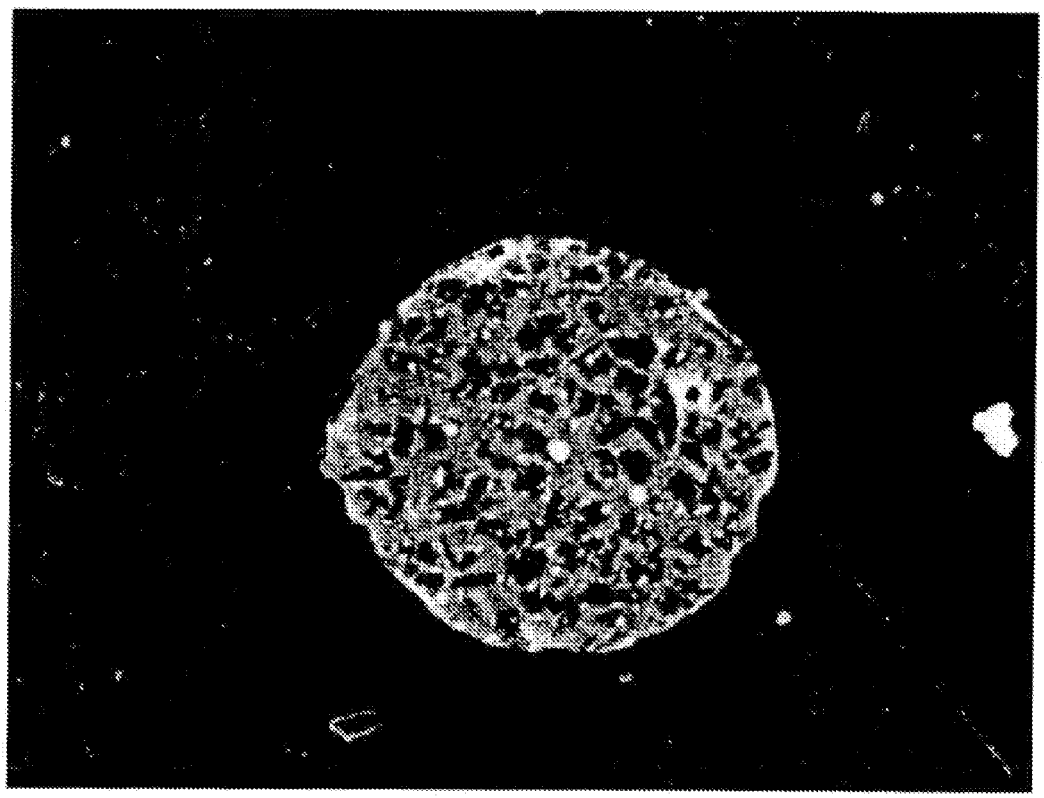
FIG. 4 is a SEM photograph of the negative active material of Example 4.

The alloy powders obtained from Experimental Examples 1 to 4 were measured by scanning electronic microscope (SEM) for their surfaces. The SEM photograph of the alloy powder of Experimental Example 1 is shown in FIG. 1; The SEM photograph of the alloy powder of Experimental Example 2 is shown in FIG. 2; the SEM photograph of the alloy powder of Experimental Example 3 is shown in FIG. 3; and the SEM photograph of the alloy powder of Experimental Example 4 is shown in FIG. 4.

As shown in FIG. 1, the structure of alloy powder of Experimental Example 1 has a very tiny crystal grain and the crystal grain is closely aggregated. Further, comparing that of Experimental Example 2, it is found that fewer cracks are generated and the surface of crystal grain is smoother. The diameter of the crystal grain determined from a SEM photograph is between 100 nm and 300 nm. Further, according to Experimental Examples 3 and 4, the crystal grain is large in the structure and the crystal grain is broken. In the Experimental Example 4, the surface of the crystal grain is smooth but the particle size of the crystal grain is bigger than that of Experimental Example 1.

As described above, it has been found that the alloy powder of Experimental Example 1 has a fine crystal grain, and the crystal grains are closely aggregated.

Figure 5:
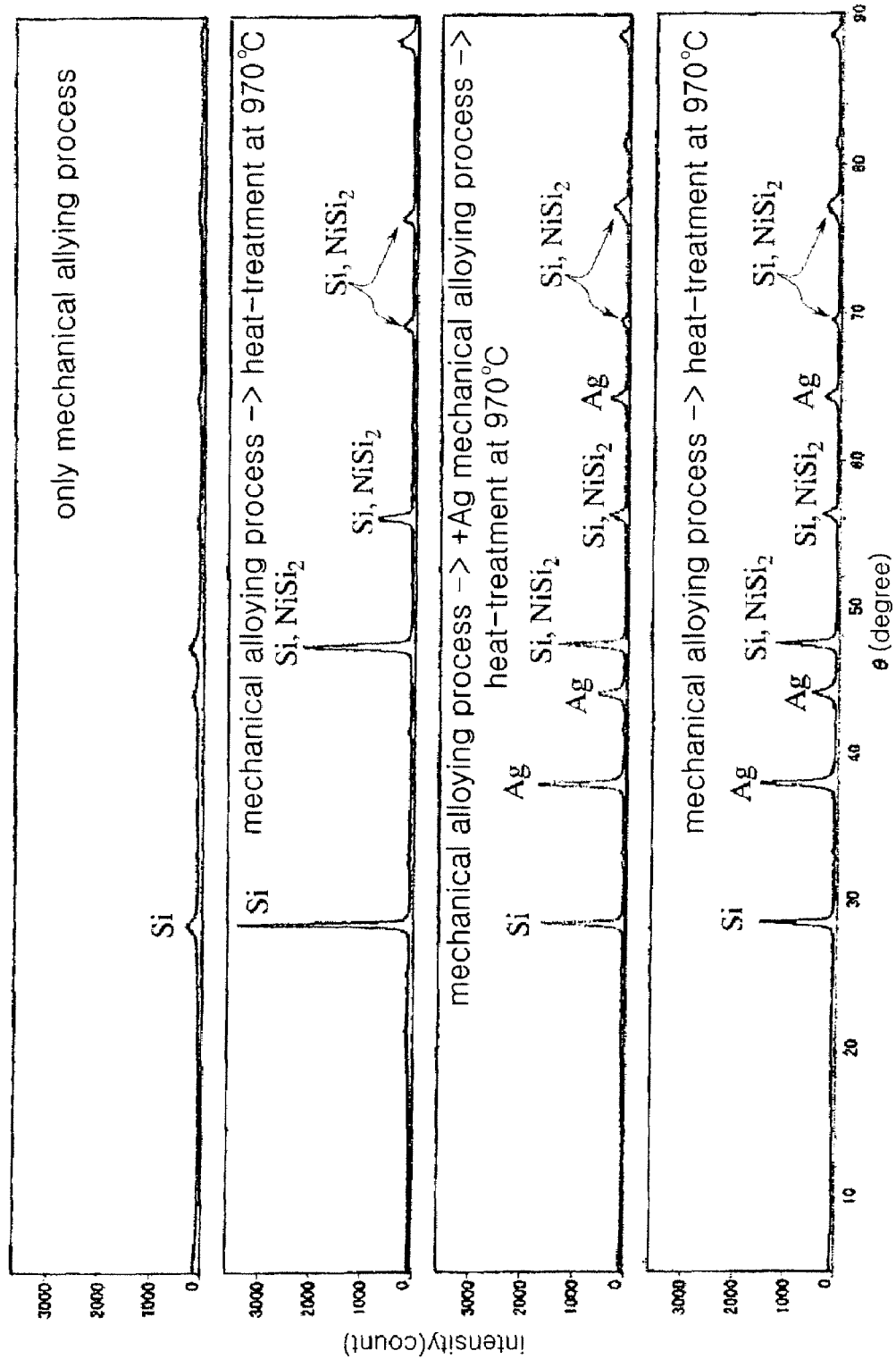
FIG. 5 is a graph illustrating the X-ray refraction pattern of the particles of each step in Example 1 and the active material of Example 2.

Furthermore, the material treated only by a mechanical alloying step, the material treated by a mechanical alloying step and a 970° C. heating step, and the material treated by a mechanical alloying step, heating step, a Ag adding step and a heating step at 940° C. in Experimental Example 1, and the material treated by a mechanical alloying step and a heating step at 940° C. in Experimental Example 2 are measured for X-ray diffraction pattern and the results are shown in FIG. 5.

As shown in FIG. 5, the material treated with only a mechanical alloying process has a very small and broad diffraction peak, which is anticipated as being amorphous. It is crystallized by heating the material. As shown in the photograph, it is confirmed that each structure inside the alloys is very small as being less than 300 nm and crystalline. The size of the crystal grain is tiny and the surface of the crystal grain is very smooth.

Battery Examples

By using negative active materials of Experimental Examples 1 to 4, rechargeable lithium batteries were prepared. 70 parts by weight of each of the negative active materials according to Experimental Examples 1 to 4, 20 parts by weight of graphite powder of conductive agent having an average diameter 3 μm, and 10 parts by weight of polyvinylidene fluoride were mixed, and added with N-methyl pyrrolidone under agitation to provide a slurry. Then, the slurry was coated on a copper foil having a thickness of 14 μm and the coated copper foil was dried and compressed to provide a negative electrode having a thickness of 40 μm. The obtained negative electrode was cut in a circle shape having a diameter of 13 mm. Between the negative electrode and lithium metal as a counter electrode, a porous polypropylene separator was inserted. $LiPF_6$ was dissolved in a mixed solvent of EC, DME, and DEC (EC:DME:DEC=3:3:1, in volume ratio) at a concentration of 1 mole/L to an electrolyte. The electrolyte was injected thereto to provide a coin type rechargeable lithium cell.

The resulting lithium cell was repeatedly charged and discharged at voltages of between 0V and 1.5V and at 0.2 C current density for 20 cycles. The relationship between the number of cycles and the discharge capacity at each cycle is shown in FIG. 6.

Figure 6:
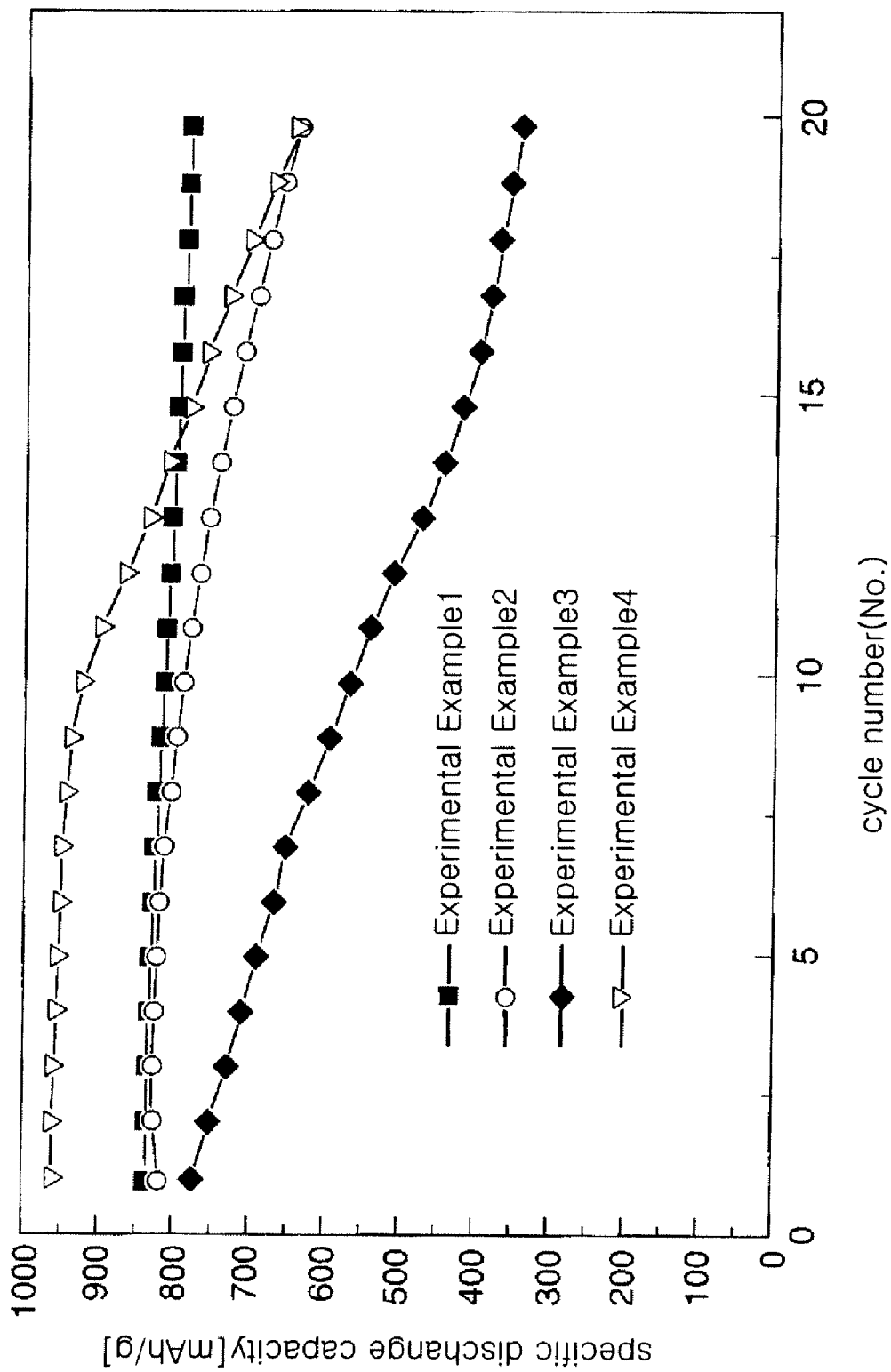
FIG. 6 is a graph illustrating the relationship between the number of cycles and the discharge capacities for the rechargeable lithium batteries of Examples 1 to 4.
Figure 5:
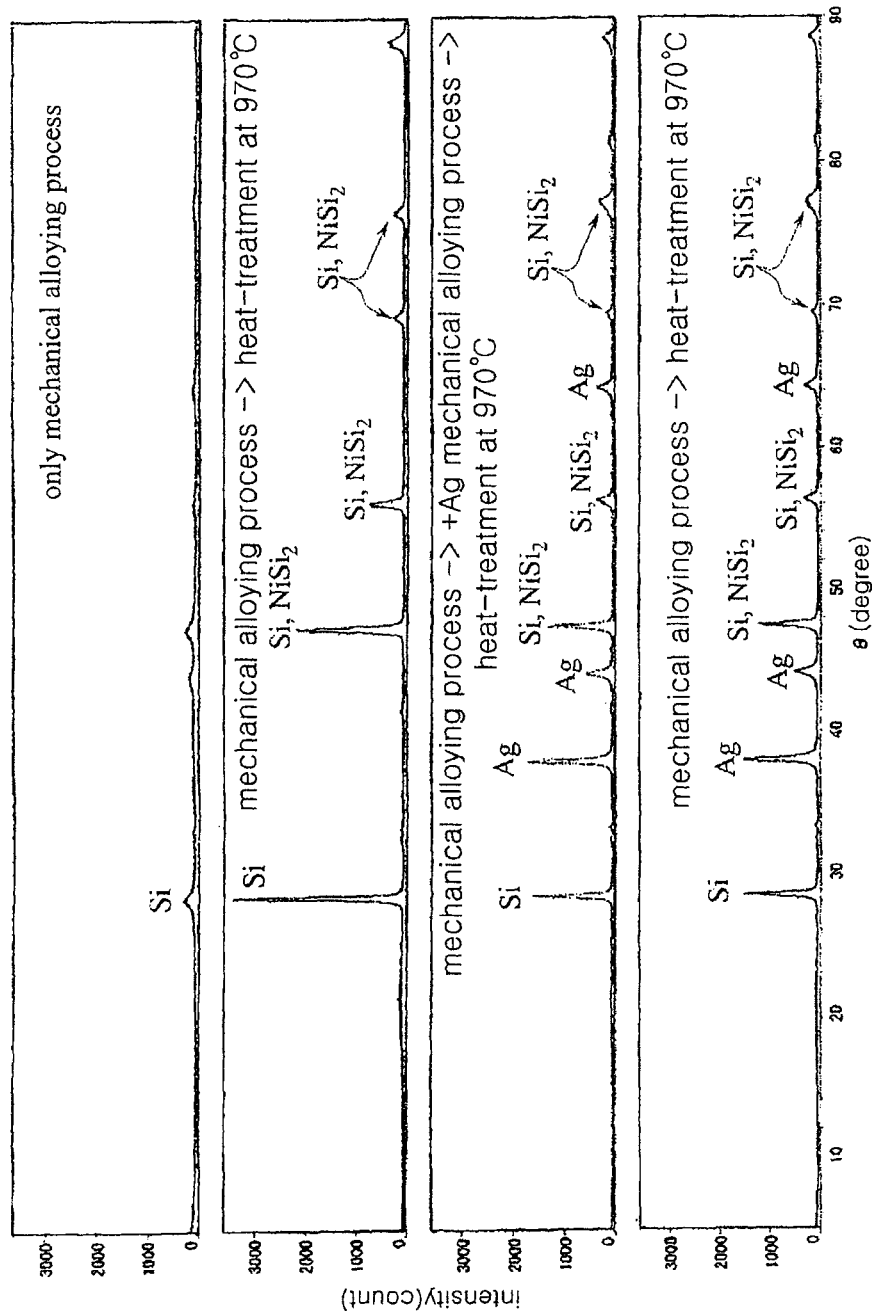
Figure 6:
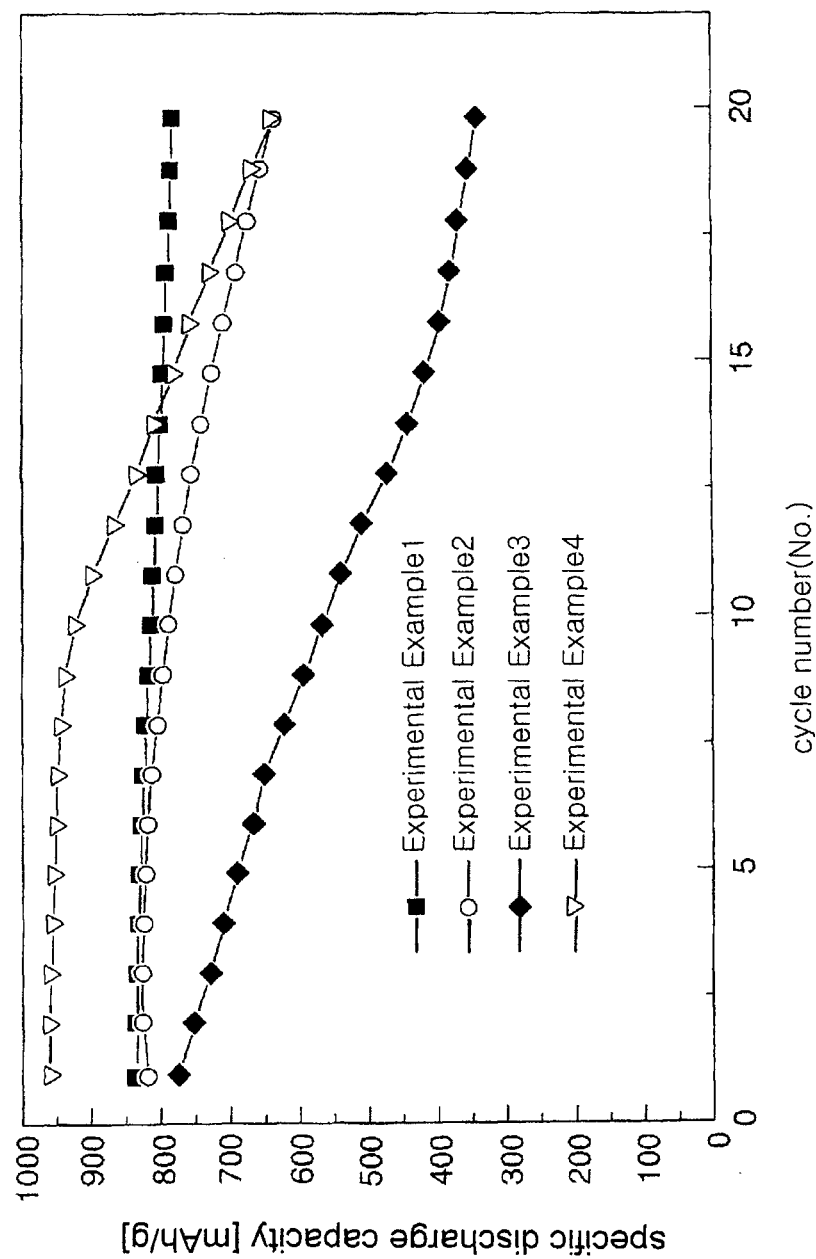

As shown in FIG. 6, in the rechargeable lithium battery of Experimental Example 1, it was confirmed that the early stage discharge capacity was nearly same as the discharge capacity after 20 cycles, and the discharge capacity was uniformly maintained. It was determined that the early stage discharge capacity of the battery of Experimental Example 2 was nearly same as that of Experimental Example 1, while the discharge capacity after 20 cycles had decreased more than for Experimental Example 1. For Experimental Example 2, as the mechanical alloying and heating processes were carried out only once, the crystal grains were not closely aggregated and the alloy powder was apparently broken upon repeating the charging cycle, thereby decreasing the discharge capacity.

Further, in Experimental Examples 3 and 4, it was found that the discharge capacity was remarkably decreased upon repeating the cycle. In Experimental Example 3, as only a mechanical alloying process was carried out, the crystal grain was not closely aggregated, the alloy powder was broken upon repeating the charging cycle, decreasing the discharge capacity. Furthermore, for Experimental Example 4 where there is no mechanical alloying process, while the initial charge capacity is high, it deteriorates rapidly after several cycles, for example, when compared to Experimental Example 1, presumably because the crystal size is much larger.

As described in above, the negative active material for the rechargeable lithium battery of the present invention had a very small particle diameter of crystal such as Si phase, SiM phase and so on, and each phases were closely alternatively linked. Thereby, the structure was rarely broken upon the charge and discharge and the cycle characteristics were improved.

Further, according to the method of preparing the negative active material for the rechargeable lithium battery, the mechanical alloy and the heating processes were alternatively repeated. Thereby, the structure was so dense to provide a negative active material having a tiny crystalline state.

The present invention has been described in detail with reference to certain preferred embodiments. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

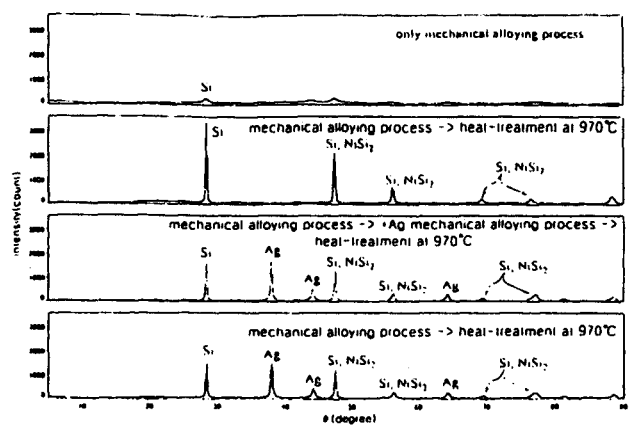

What is claimed is:

1. A method of preparing a negative active material for a rechargeable lithium battery comprising:
   first alloying Si and element M by a mechanical alloying process to provide a SiM alloy, wherein M is selected from the group consisting of Ni, Co, B, Cr, Cu, Fe, Mn, Ti, Y and combinations thereof;
   first heating the SiM alloy at a first temperature, wherein the first temperature is below a melting point of the SiM alloy;
   adding a powder of element X to the heated SiM alloy wherein X is selected from the group consisting of Ag, Cu, Au and combinations thereof, provided that if M is Cu, X is not Cu;

second alloying the combined SiM alloy and element X by a mechanical alloying process to provide a SiMX alloy; and second heating the SiMX alloy at a second temperature lower than the first temperature;

wherein the negative active material comprises a Si phase, a SiM phase and at least one of an X phase and a SiX phase, wherein each of the phases has a crystal grain size between 100 nm and 500 nm.

2. The method according to claim 1, wherein the first heating is carried out at a temperature between about 20° C. and about 100° C. below the melting point of the SiM alloy phase.

3. The method according to claim 1, wherein the second heating is carried out at a temperature between abut 20° C. and 200° C. below the melting point of the element X.

* * * * *

UNITED STATES PATENT AND TRADEMARK OFFICE
CERTIFICATE OF CORRECTION

PATENT NO. : 7,658,871 B2  
APPLICATION NO. : 12/182998  
DATED : February 9, 2010  
INVENTOR(S) : Keiko Matsubara et al.

Page 1 of 1

It is certified that error appears in the above-identified patent and that said Letters Patent is hereby corrected as shown below:

On the Title Page

(75) Inventors   Delete "Keiko Matsubara, Yokohama" Insert -- Keiko Matsubara, Yokohama-shi --

Delete "Toshiaki Tsuno, Yokohama" Insert -- Toshiaki Tsuno, Yokohama-shi --

In the Claims

Column 12, Claim 3, line 6   Delete "abut" Insert -- about --

Signed and Sealed this  
Fourth Day of October, 2011

David J. Kappos  
*Director of the United States Patent and Trademark Office*

UNITED STATES PATENT AND TRADEMARK OFFICE
CERTIFICATE OF CORRECTION

| | |
|---|---|
| PATENT NO. | : 7,658,871 B2 |
| APPLICATION NO. | : 12/182998 |
| DATED | : February 9, 2010 |
| INVENTOR(S) | : Keiko Matsubara et al. |

It is certified that error appears in the above-identified patent and that said Letters Patent is hereby corrected as shown below:

On the Title Page
(75) Inventors         Delete "Akira Takamuku, Yokohama"
                       Insert -- Akira Takamuku, Yokohama-shi --

In the Drawings
FIG. 5, Sheet 5 of 6   Delete Drawing Sheet 5 and substitute therefore the Drawing Sheet, consisting of FIG. 5, as shown on the attached page FIG. 6, Sheet 6 of 6   Delete Drawing Sheet 6 and substitute therefore the Drawing Sheet, consisting of FIG. 6, as shown on the attached page Signed and Sealed this
Twenty-eighth Day of August, 2012

David J. Kappos
*Director of the United States Patent and Trademark Office*

(12) United States Patent
Matsubara et al.

(10) Patent No.: US 7,658,871 B2
(45) Date of Patent: Feb. 9, 2010

(54) METHOD OF PREPARING A NEGATIVE ACTIVE MATERIAL FOR RECHARGEABLE LITHIUM BATTERY

(75) Inventors: Keiko Matsubara, Yokohama (JP); Akira Takamuku, Yokohama (JP); Toshiaki Tsuno, Yokohama (JP); Sung-Soo Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/182,998

(22) Filed: Jul. 30, 2008

(65) Prior Publication Data
US 2008/0302999 A1    Dec. 11, 2008

Related U.S. Application Data

(62) Division of application No. 10/923,300, filed on Aug. 20, 2004, now abandoned.

(30) Foreign Application Priority Data

Aug. 22, 2003  (JP)  ............ 2003-299282
Feb. 12, 2004  (KR)  ........ 10-2004-0009366

(51) Int. Cl.
*A62D 3/00*  (2007.01)

(52) U.S. Cl. ............ 252/519.54; 29/623.1; 427/58; 429/218.1; 429/232

(58) Field of Classification Search ............ 252/182.1, 252/186.2, 500, 519.64; 29/623.1; 204/192.15; 419/66; 429/209, 218.1, 231.95, 232; 427/58
See application file for complete search history.

(56) References Cited

U.S. PATENT DOCUMENTS

| | | | |
|---|---|---|---|
| 6,066,414 A * | 5/2000 | Imoto et al. | 429/218.1 |
| 6,103,213 A | 8/2000 | Nakamura et al. | |
| 6,235,427 B1 * | 5/2001 | Idota et al. | 429/218.1 |
| 6,541,156 B1 * | 4/2003 | Fuse et al. | 429/218.1 |

(Continued)

FOREIGN PATENT DOCUMENTS

JP    3-163758    7/1991

(Continued)

OTHER PUBLICATIONS

Sirleto, et al., *Spontaneous Raman emission in porous silicon at 1.5 μm and prospects for a Raman amplifier*, Journal of Optics A: Pure and Applied Optics, vol. 8, (2006), pp. S574-S577.

(Continued)

*Primary Examiner*—Mark Kopec
*Assistant Examiner*—Khanh Tuan Nguyen
(74) *Attorney, Agent, or Firm*—Christie, Parker & Hale, LLP

(57) ABSTRACT

Disclosed is a negative active material for a rechargeable lithium battery comprising a Si phase, a SiM phase and at least one of a X phase and a SiX phase, wherein each of phases has a crystal grain size of 100 nm and 500 nm. The element M is at least one selected from the group consisting of Ni, Co, B, Cr, Cu, Fe, Mn, Ti, and Y, the element X is at least one selected from the group consisting of Ag, Cu, and Au. However, where M is Cu, X is not Cu.

3 Claims, 6 Drawing Sheets